United States Patent
Zhang et al.

(10) Patent No.: US 10,909,187 B2
(45) Date of Patent: Feb. 2, 2021

(54) DOCUMENT PROCESSING METHOD AND DEVICE

(71) Applicant: BEIJING DEEP INTELLIGENT PHARMA CO., LTD., Beijing (CN)

(72) Inventors: Min Zhang, Beijing (CN); Zheng Guan, Beijing (CN)

(73) Assignee: BEIJING DEEP INTELLIGENT PHARMA CO., LTD., Beijing (CN)

(*) Notice: Subject to any disclaimer, the term of this patent is extended or adjusted under 35 U.S.C. 154(b) by 239 days.

(21) Appl. No.: 16/113,209

(22) Filed: Aug. 27, 2018

(65) Prior Publication Data
US 2019/0318006 A1  Oct. 17, 2019

(30) Foreign Application Priority Data
Apr. 13, 2018 (CN) .......................... 2018 1 0332982

(51) Int. Cl.
*G06F 16/00* (2019.01)
*G06F 16/93* (2019.01)
*G06F 16/14* (2019.01)
*G06F 16/16* (2019.01)
*G06F 16/185* (2019.01)

(52) U.S. Cl.
CPC ............ *G06F 16/93* (2019.01); *G06F 16/148* (2019.01); *G06F 16/166* (2019.01); *G06F 16/185* (2019.01)

(58) Field of Classification Search
CPC ...... G06F 16/93; G06F 16/166; G06F 16/148; G06F 16/185
See application file for complete search history.

(56) References Cited

U.S. PATENT DOCUMENTS

| | | | | |
|---|---|---|---|---|
| 5,832,470 A | * | 11/1998 | Morita | G06F 16/355 |
| 2006/0085405 A1 | * | 4/2006 | Hsu | G06F 16/93 |
| 2007/0130176 A1 | * | 6/2007 | Kawabe | G06F 40/186 |
| 2013/0054613 A1 | * | 2/2013 | Bishop | G06F 16/958 |
| | | | | 707/748 |

FOREIGN PATENT DOCUMENTS

| | | |
|---|---|---|
| CN | 102999637 | 3/2013 |
| CN | 103491451 | 1/2014 |
| CN | 104636469 | 5/2015 |
| CN | 105183829 | 12/2015 |
| CN | 106055554 | 10/2016 |
| CN | 106528877 | 3/2017 |

* cited by examiner

*Primary Examiner* — Jared M Bibbee
(74) *Attorney, Agent, or Firm* — Dority & Manning, P.A.

(57) ABSTRACT

A document processing method and device are provided. The method includes: acquiring a template of a standard format document, the template including folders having a hierarchical structure, generating folder labels corresponding to the folders on the basis of the folders, acquiring a document to be processed, generating a document label of the document to be processed on the basis of the document to be processed, determining whether there is a folder label matched with the document label of the document to be processed, and associating the document to be processed with the folder corresponding to the matched folder label in a case that there is the folder label.

16 Claims, 4 Drawing Sheets

DOCUMENT PROCESSING METHOD AND DEVICE

CROSS REFERENCE TO RELATED APPLICATION

The present application claims the priority to Chinese Patent Application No. 201810332982.2, titled "DOCUMENT PROCESSING METHOD AND DEVICE", filed on Apr. 13, 2018 with the State Intellectual Property Office of the PRC, which is incorporated herein by reference in its entirety.

FIELD

The present disclosure relates to the field of Internet technology, and particularly to a document processing method and device.

BACKGROUND

In order to improve normalization of information management, documents with a standard format are generally used to store information. The documents have standard structures and names. For example, in order to improve normalization of medicinal products application, medicine enterprises usually need to submit standard format documents to the supervision department during medical research and development and medical supervision. Electronic common technical document (eCTD) is the internationally accepted standard format document for medical products application and registration. Other standard format documents include Non-eCTD Electronic Submission (NeES), Identification of Medicinal Products (IDMP), etc.

A large number of electronic submissions are included in these standard format documents, and the electronic submissions are classified according to fixed modules and a hierarchical relationship between the modules.

A document with a format is taken as a standard format document. In the conventional art, electronic submissions are manually processed to generate a standard format document. Specifically, the electronic submissions are classified into the folders having a hierarchical structure in the standard format modules on the basis of the contents of the electronic submissions, to form tree-structure files including the electronic submissions, and the tree-structure files are processed to form a standard format document. The method for processing the electronic submissions manually is inefficient and takes long time, and manual processing may cause errors, thereby resulting in low efficiency and low accuracy of the standard format document.

SUMMARY

In order to solve the problem of low efficiency and low accuracy existing in the document processing method in the conventional art, a document processing method and device are provided according to embodiments of the present disclosure.

A document processing method is provided in an embodiment of the present disclosure, which includes:
acquiring a template of a standard format document, the template including folders having a hierarchical structure, and generating folder labels corresponding to the folders;
acquiring a document to be processed and generating a document label of the document to be processed; and
determining whether there is a folder label matched with the document label of the document to be processed, and associating the document to be processed with the folder corresponding to the matched folder label in a case that there is the folder label matched with the document label of the document to be processed.

In an embodiment, the generating folder labels corresponding to the folders includes:
acquiring names of the folders; and
generating folder labels corresponding to the folders on the basis of the names of the folders.

In an embodiment, the generating a document label of the document to be processed includes:
acquiring a name of the document to be processed; and
generating a document label of the document to be processed on the basis of the name of the document to be processed.

In an embodiment, the generating a document label of the document to be processed includes:
analyzing the document to be processed to acquire at least one of a text title, a header, a footer, a directory, a home page text content and a bookmark in the document to be processed; and
generating a document label of the document to be processed on the basis of at least one of the text title, the header, the footer, the directory, the home page text content and the bookmark in the document to be processed.

In an embodiment, the method further includes:
renaming the document to be processed associated with the folder corresponding to the matched folder label, on the basis of the folder label matched with the document label of the document to be processed.

A document processing device is further provided in an embodiment of the present disclosure, which includes: a folder label acquisition unit, a document label generation unit, a determination unit and a to-be-processed document association unit;
the folder label acquisition unit is configured to acquire a template of a standard format document, the template including folders having a hierarchical structure, and generate folder labels corresponding to the folders;
the document label generation unit is configured to acquire a document to be processed and generate a document label of the document to be processed;
the determination unit is configured to determine whether there is a folder label matched with the document label of the document to be processed; and
the to-be-processed document association unit is configured to associate the document to be processed with the folder corresponding to the matched folder label in a case that there is the folder label matched with the document label of the document to be processed.

In an embodiment, the folder label generation unit includes: a template acquisition unit, a folder name acquisition unit, and a folder label generation sub-unit;
the template acquisition unit is configured to acquire a template of a standard format document, the template including folders having a hierarchical structure;
the folder name acquisition unit is configured to acquire names of the folders; and
the folder label generation sub-unit is configured to generate folder labels corresponding to the folders on the basis of the names of the folders.

In an embodiment, the document label generation unit includes: a to-be-processed document acquisition unit, a to-be-processed document name acquisition unit and a first document label generation sub-unit;

the to-be-processed document acquisition unit is configured to acquire a document to be processed;

the to-be-processed document name acquisition unit is configured to acquire a name of the document to be processed; and the first document label generation sub-unit is configured to generate a document label of the document to be processed on the basis of the name of the document to be processed.

In an embodiment, the document label generation unit includes: a to-be-processed document acquisition unit, a to-be-processed document analysis unit and a second document label generation sub-unit;

the to-be-processed document acquisition unit is configured to acquire a document to be processed;

the to-be-processed document analysis unit is configured to analyze the document to be processed to acquire at least one of a text title, a header, a footer, a directory, a home page text content and a bookmark in the document to be processed; and the second document label generation sub-unit is configured to generate a document label of the document to be processed on the basis of at least one of the text title, the header, the footer, the directory, the home page text content and the bookmark in the document to be processed In an embodiment, the device further includes a renaming unit;

the renaming unit is configured to rename the document to be processed associated with the folder corresponding to the matched folder label, on the basis of the folder label matched with the document label of the document to be processed.

With the document processing method and device provided in the embodiments of the present disclosure, a template of a standard format document is acquired, the template including folders having a hierarchical structure. Folder labels corresponding to the folders are generated on the basis of the folders. A document to be processed is acquired, and a document label of the document to be processed is generated on the basis of the document to be processed. It is determined whether there is a folder label matched with the document label of the document to be processed. In a case that there is the folder label matched with the document label of the document to be processed, the document to be processed is associated with the folder corresponding to the matched folder label. The folder labels are generated on the basis of the folders and thus are relevant to the folders, and the document label is generated on the basis of the document to be processed and thus is relevant to the document to be processed. In this way, it can be determined whether the folder matches the document to be processed by determining whether the folder label matches the document label, and the document to be processed is associated with the matched folder, thereby realizing automatic association of the document to be processed and improving efficiency and accuracy of document processing.

BRIEF DESCRIPTION OF THE DRAWINGS

In order to illustrate the technical solutions in embodiments of the present disclosure or in the conventional art more clearly, drawings to be used in the embodiments or in the conventional art will be briefly described hereinafter. Obviously, drawings in the following descriptions merely describe some of the embodiments of the present disclosure, and those skilled in the art may obtain other drawings based on these drawings without any creative labors.

DETAILED DESCRIPTION OF EMBODIMENTS

In order to enable those skilled in the art to better understand technical solutions of the present disclosure, the technical solutions in the embodiments of the present disclosure will be described clearly and completely in conjunction with the drawings used in the embodiments hereinafter. Obviously, the embodiments to be described are only a part rather than all of the embodiments of the present disclosure. Any other embodiments obtained based on these embodiments by those skilled in the art without any creative effort fall in the protection scope of the present disclosure.

A standard format document is a document having a standard format, which usually includes multiple modules. The module may be displayed in a folder form or in other form. Each module may include folders, each folder may include sub-folders, and each sub-folder may include at least one of a secondary folder and an electronic submission, and so on. These folders in a hierarchical structure form a tree structure of a standard format document. Since the folders may include at least one of the folder and the electronic submission, the standard format document includes a large number of electronic submissions.

In the conventional art, it is required to process electronic submissions manually, where the electronic submissions are classified into the folders in the corresponding modules on the basis of the contents of the electronic submissions, to form tree-structure files including the electronic submissions. In addition, it is required to manually recognize the contents of the electronic submissions if the electronic submissions are processed manually. It takes much time and energy to compare the contents of the electronic submissions with names of the folders and classify the electronic submissions into corresponding folders. Moreover, errors may appear due to negligence during the comparison and classification, thereby resulting in low efficiency and low accuracy of document processing.

Figure 1:
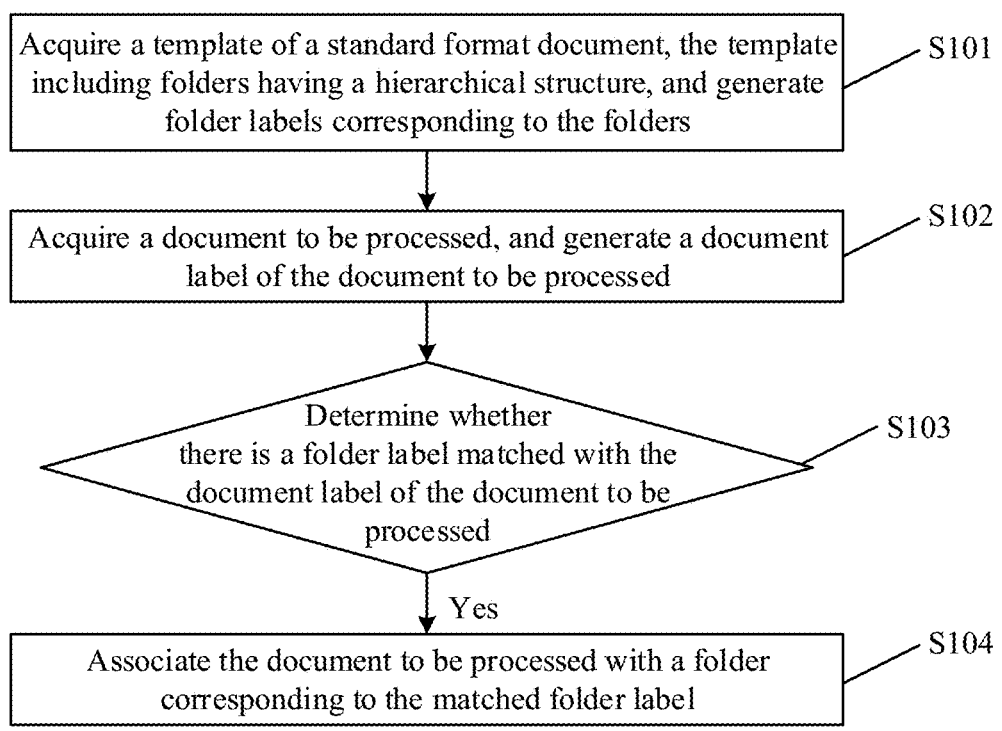
FIG. 1 is a flowchart of a document processing method according to an embodiment of the present disclosure.

In order to solve the above technical problem, a document processing method is provided in the embodiments of the present disclosure. Reference is made to FIG. 1, which is a flowchart of a document processing method according to an embodiment of the present disclosure. The method includes steps S101 to S104 in the following.

In step S101, a template of a standard format document is acquired, the template including folders having a hierarchical structure, and folder labels corresponding to the folders are generated.

A standard format document is a document having a standard format, which includes folders having a hierarchical structure. The folders may include electronic submissions.

Figure 2:
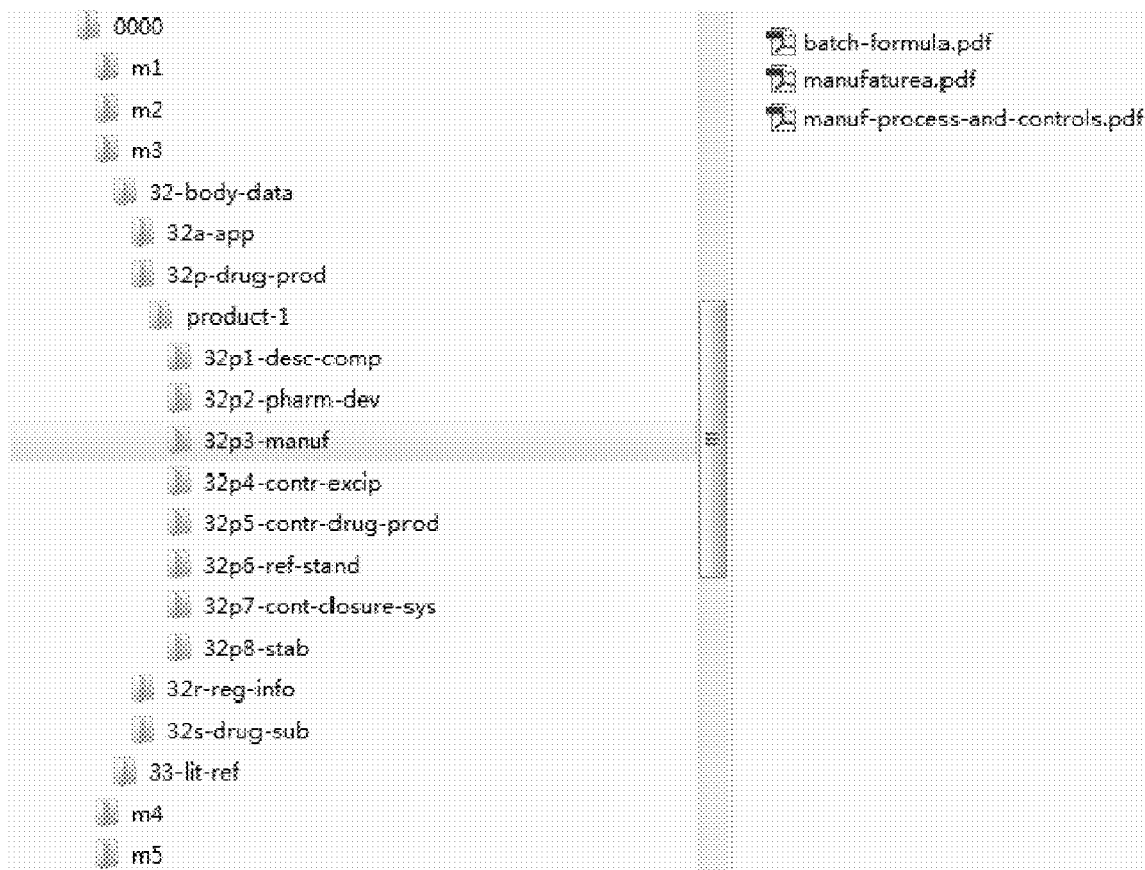
FIG. 2 is a schematic view showing an electronic common technical document for medicinal products according to an embodiment of the present disclosure.

As shown in FIG. 2, taking an electronic common technical document for medicinal products as an example, the electronic common technical document "0000" may include 5 modules, such as administrative information, abstract, quality, non-clinical research report and clinical research report, which correspond to folders "m1", "m2", "m3", "m4" and "m5" respectively. Each module may include one or more folders. For example, the folder "m3" includes a folder "32-body-data". The folder "32-body-data" may include folders "32a-app", "32p-drug-prod", "32r-reg-info" and "32s-drug-sub". The folder "32p-drug-prod" may include a folder "product-1". The folder "product-1" may include folders "32p1-desc-comp", "32p2-pharm-dev", "32p3-manuf", "32p4-contr-excip", "32p5-contr-drug-prod", "32p6-ref-stand", "32p7-cont-closure-sys" and "32p8-stab". The folder "32p3-manuf" may include 3 electronic submissions.

In an implementation, a folder may include folders and electronic submissions, which is not illustrated by examples herein.

Figure 3:
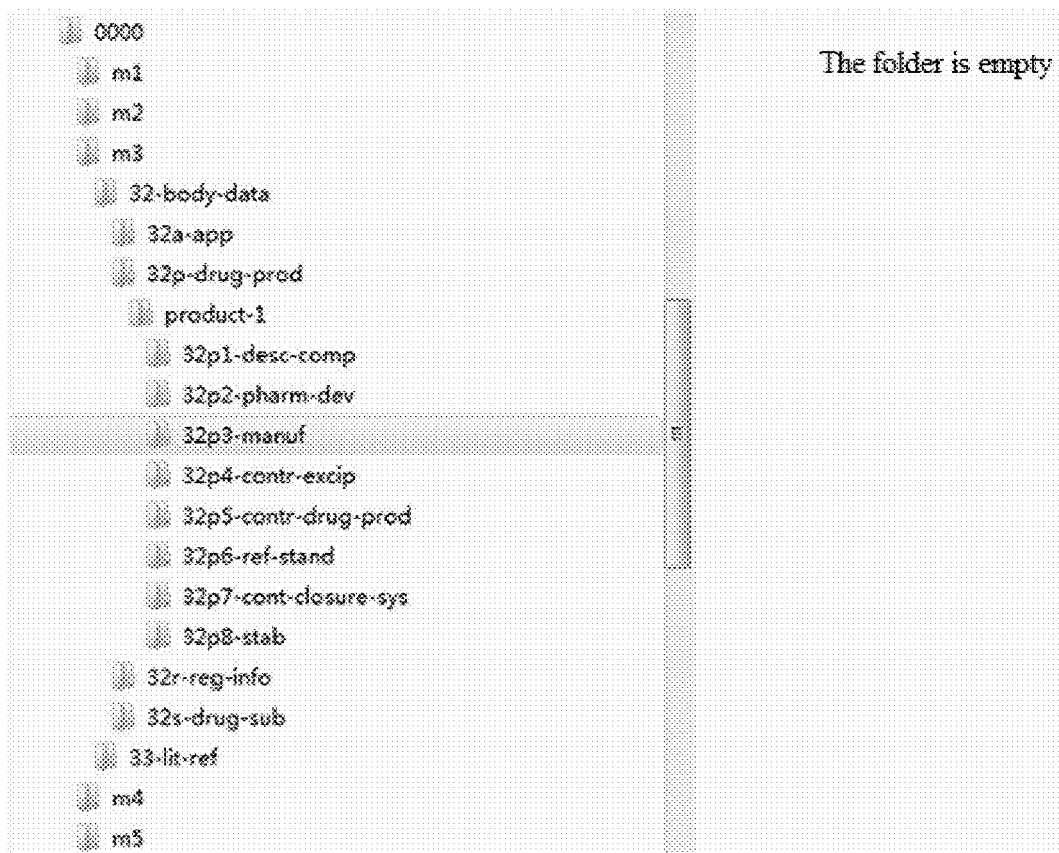
FIG. 3 is a schematic view showing a template of an electronic common technical document for medicinal products according to an embodiment of the present disclosure.

A template of a standard format document may not include an electronic submission. FIG. 3 shows a template of an electronic common technical document for medicinal products. The template of the standard format document can indicate a hierarchical relationship between the electronic submissions in the standard format document and a hierarchical structure between folders. For different submission objects, the template of the standard format document may include different hierarchical structures. A suitable template of the standard format document may be selected on the basis of practical situations in an implementation.

After the template of the standard format document is acquired, folder labels corresponding to the folders may be generated on the basis of the folders having a hierarchical structure. Specifically, names of the folders are acquired, and folder labels corresponding to the folders are generated on the basis of the names of the folders.

Since the folder is included in the template of the standard format document and is usually named in a fixed format, a name of the folder usually includes a position code of the folder and document information corresponding to the folder. For example, a folder is named as "32-body-data", "32" may represent that the folder is included in a module 3, and "body-data" represents document information of the folder.

Correspondingly, a folder label may represent information of the folder. Since the name of the folder can reflect a position code of the folder and document information of the folder, the folder label may be generated on the basis of the name of the folder. Specifically, the folder label may be identical to the name of the folder, or may be a part of the name of the folder. For example, if a first module is named as "32-body-data", the folder label may be "32", "body-data" or an initial letter combination "bd" of "body-data". The folder label may be generated on the basis of the name of the folder in other ways, and the generation process is not limited to the example described above.

With regard to the folders having a hierarchical structure, folder labels of a part of the folders may be acquired. Specifically, information of a folder is acquired to determine whether there is an electronic submission corresponding to the folder. If there is an electronic submission, it is indicated that the folder may include the electronic submission, and a folder label of the folder may be acquired. If there is no electronic submission, it is indicated that the folder includes only sub-folders, and a folder label of the folder may be not acquired. In a latter case, implementation of the embodiments of the present disclosure is not influenced.

In step S102, a document to be processed is acquired and a document label of the document to be processed is generated.

In the embodiment of the present disclosure, an electronic submission may be acquired as a document to be processed. Acquisition of the document to be processed may be monitored to facilitate processing multiple documents to be processed. With regard to each document to be processed, a document label of the document to be processed is generated.

The document label of the document to be processed may represent main content of the document to be processed. For example, the document label "body-data" may represent main content of the document. Alternatively, the document label of the document to be processed may represent position information of the document to be processed in the standard format document. For example, the document label "32" may represent that the document to be processed is positioned in the second folder of the module 3.

As a possible implementation, the generating of a document label of the document to be processed includes: acquiring a name of the document to be processed; and generating a document label of the document to be processed on the basis of the name of the document to be processed. Specifically, the document label of the document to be processed may be identical to the name of the document to be processed or relevant to the name of the document to be processed. For example, the name of the document to be processed is "2.4 Non-clinical Overview", the generated document label of the document to be processed may be "2.4 Non-clinical Overview" or "m2.4 NCO".

Generally, the document to be processed is named according to rules so as to facilitate processing the document to be processed. The rules usually follow the naming form of the folders of the corresponding standard format document. Therefore, the name of the document to be processed may represent at least one of main content of the document to be processed and position information of the document to be processed in the standard format document. The document label of the document to be processed is generated from the name of the document to be processed, so that the document label of the document to be processed is acquired conveniently and quickly without opening the document to be processed. Moreover, it is unnecessary to open the document to be processed, security of the document to be processed is enhanced.

As another possible implementation, the generating of a document label of the document to be processed may include: analyzing the document to be processed; acquiring at least one of a text title, a header, a footer, a directory and a bookmark in the document to be processed; and generating a document label of the document to be processed on the basis of at least one of the text title, the header, the footer, the directory and the bookmark in the document to be processed. The text title in the document to be processed may be a main title or a secondary title or the like. The directory may be composed of multiple titles or other information.

The document label of the document to be processed may be identical or similar to the content of the text title, the header, the footer, the directory and the bookmark in the document to be processed. For example, if the text title of the document to be processed is "2.4 Non-clinical Overview", the generated document label may be "m2.4 NCO" or "2.4 Non-clinical Overview". If the header of the document to be processed is "2.4", the generated document label may be "2.4". If the bookmark in the document to be processed is "Non-clinical Overview", the generated document label may be "Non-clinical Overview" or "NCO". It should be noted that one document to be processed may correspond to multiple document labels.

Items, such as the text title, the header, the footer, the directory and the bookmark, are usually important in the document to be processed. These items may represent at least one of main content of the document to be processed and position information of the document to be processed in the standard format document. A more accurate document label can be acquired in the above implementation, and the main content of the document to be processed and the position information of the document to be processed in the standard format document can be represented better.

The document to be processed is analyzed, and the home page content of the document to be processed may be acquired. Key information of the home page content is extracted, and a document label of the document to be processed is generated on the basis of the extracted key information. For example, keywords of the home page text content may be extracted, and the document label of the document to be processed is generated on the basis of the keywords.

Prior to analysis of the document to be processed, a type of the document to be processed may be determined. For example, the document to be processed may have a document format (doc) or a portable document format (pdf), so that at least one of the text title, the header, the footer, the directory, the home page text content and the bookmark in the document to be processed is acquired more accurately.

Only one of the two methods for generating a document label of the document to be processed may be used. For example, only a name of the document to be processed is acquired, and a document label of the document to be processed is generated on the basis of the name of the document to be processed. Alternatively, the two methods may be used at the same time. For example, a name of the document to be processed is acquired while at least one of the text title, the header, the footer, the directory, the home page text content and the bookmark in the document to be processed is acquired. Document labels are generated for the name, the text title, the header, the footer, the directory, the home page text content and the bookmark. Alternatively, a name of the document to be processed is acquired and a document label corresponding to the name is generated. If the matching in S103 fails, at least one of the text title, the header, the footer, the directory, the home page text content and the bookmark in the document to be processed is acquired, and a corresponding document label is generated.

Step S102 may be executed after step S101, before step S101 or concurrently with step S101, which does not affect implementation of the embodiment of the present disclosure.

In step S103, it is determined whether there is a folder label matched with the document label of the document to be processed. In a case that there is the folder label matched with the document label of the document to be processed, step S104 is executed.

In the embodiment of the present disclosure, the folder label may represent information of the folder, and the document label may represent at least one of main content of the document to be processed and position information of the document to be processed in the standard format document. If the document label representing the main content of the document to be processed matches the folder label representing the information of the folder, it is indicated that the information of the folder is relevant to the content of the document to be processed, and the document to be processed matches the folder. If the document label representing the position information of the document to be processed in the standard format document matches the folder label representing the information of the folder, it is indicated that the document to be processed matches the folder, and the document to be processed is stored in the folder.

It can be determined whether the folder label matches the document label in many manners. As a possible implementation, it may be determined whether the folder label is totally or partially identical to the document label so as to determine whether the folder label matches the document label. If they are totally or partially identical, it is determined that the folder label matches the document label. For example, if the folder label is "32-body-data" and the document label is "3.2-body-data", it is determined that the folder label matches the document label. As another possible implementation, if the folder label includes English words or characters and the document label includes Chinese characters, it is determined whether the English words are identical to English translation of the Chinese characters. Further, if the English words are identical to English translation of the Chinese characters, it is determined that the folder label matches the document label. Alternatively, it is determined whether the English words are identical to an abbreviation of English translation of the Chinese characters. If the English words are identical to the abbreviation of English translation of the Chinese characters, it is determined that the folder label matches the document label. For example, if the folder label is "32-body-data" and the document label is "主体数据", it is determined that the folder label matches the document label. It may be determined whether the folder label matches the document label in other manners in the embodiments of the present disclosure. Examples of the other manners are not described herein.

It should be noted that the folder label may represent information of the folder as much as possible, and the corresponding document label may represent information of the document as much as possible, so as to facilitate matching between the folder label and the document label. If there is no folder label matched with the document label of the document to be processed, it is determined that the matching fails. In this case, it may be processed manually.

In a case that the document label is generated from the name of the document to be processed, S102 may be executed. The document to be processed is analyzed, and at least one of a text title, a header, a footer, a directory, and a home page text content and a bookmark in the document to be processed is acquired. A new document label of the document to be processed is generated on the basis of at least one of the text title, the header, the footer, the directory, the home page text content and the bookmark in the document to be processed, so as to determine whether there is a folder label matched with the new document label of the document to be processed. If there is the folder label, S104 is executed.

In step S104, the document to be processed is associated with the folder corresponding to the matched folder label.

In a case that it is determined that the document label of the document to be processed matches the folder label of the folder, it is indicated that the document to be processed matches the folder. In this case, the document to be processed can be associated with the folder to process the document to be processed. The associating methods may include: storing the document to be processed in the folder; storing a storage position of the document to be processed in the folder; or establishing a mapping relationship between the document to be processed and the folder. The association method is not limited herein.

Since the document to be processed may be named by irregular naming manners, the document to be processed can be renamed on the basis of the folder label of the matched folder after the document to be processed is associated with the matched folder. Similarly, the text title in the document to be processed can also be renamed.

After the document to be processed is associated with the matched folder, a format of the tree-structure file including the document to be processed may be converted to form a standard format document. After the standard format document is formed, other parameters of the formed standard format document may be set, which are not described herein.

With the document processing method provided in the embodiment of the present disclosure, a template of a standard format document is acquired, the template including folders having a hierarchical structure. Folder labels corresponding to the folders are generated on the basis of the folders. A document to be processed is acquired, and a document label of the document to be processed is generated on the basis of the document to be processed. It is determined whether there is a folder label matched with the document label of the document to be processed. If there is the folder label matched with the document label of the document to be processed, the document to be processed is associated with the folder corresponding to the matched folder label. The folder labels are generated on the basis of corresponding folders and thus are relevant to the folders, and the document label is generated on the basis of the document to be processed and thus is relevant to the document to be processed. Therefore, it can be determined whether the folder matches the document to be processed by determining whether the folder label matches the document label, and the document to be processed can be associated with the matched folder, thereby realizing automatic association of the document to be processed and improving efficiency and accuracy of document processing.

A document processing device is further provided in an embodiment of the present disclosure based on the document processing method provided in the above embodiments. Operation principles of the document processing device will be described in detail hereinafter in conjunction with the drawings.

Figure 4:
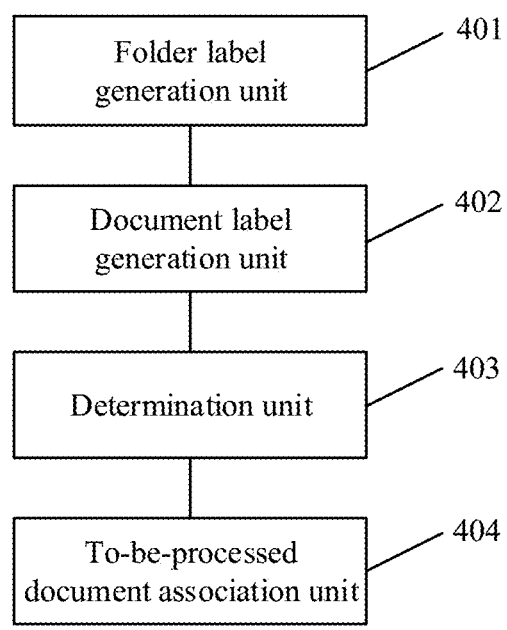
FIG. 4 is a structural block diagram of a document processing device according to an embodiment of the present disclosure.

Reference is made to FIG. 4, which is a structural block diagram of a document processing device according to an embodiment of the present disclosure. The device includes a folder label acquisition unit 401, a document label generation unit 402, a determination unit 403 and a to-be-processed document association unit 404.

The folder label acquisition unit 401 is configured to acquire a template of a standard format document, the template including folders having a hierarchical structure, and generate folder labels corresponding to the folders.

The document label generation unit 402 is configured to acquire a document to be processed and generate a document label of the document to be processed.

The determination unit 403 is configured to determine whether there is a folder label matched with the document label of the document to be processed.

The to-be-processed document association unit 404 is configured to associate the document to be processed with the folder corresponding to the matched folder label in a case that there is the folder label.

Optionally, the folder label generation unit includes: a template acquisition unit, a folder name acquisition unit and a folder label generation subunit.

The template acquisition unit is configured to acquire a template of a standard format document, the template including folders having a hierarchical structure.

The folder name acquisition unit is configured to acquire names of the folders.

The folder label generation sub-unit is configured to generate folder labels corresponding to the folders on the basis of the names of the folders.

Optionally, the document label generation unit includes: a to-be-processed document acquisition unit, a to-be-processed document name acquisition unit and a first document label generation subunit.

The to-be-processed document acquisition unit is configured to acquire a document to be processed.

The to-be-processed document name acquisition unit is configured to acquire a name of the document to be processed.

The first document label generation sub-unit is configured to generate a document label of the document to be processed on the basis of the name of the document to be processed.

Optionally, the document label generation unit includes: a to-be-processed document acquisition unit, a to-be-processed document analysis unit and a second document label generation subunit.

The to-be-processed document acquisition unit is configured to acquire a document to be processed.

The to-be-processed document analysis unit is configured to analyze the document to be processed to acquire at least one of a text title, a header, a footer, a directory, a home page text content and a bookmark in the document to be processed.

The second document label generation sub-unit is configured to generate a document label of the document to be processed on the basis of at least one of the text title, the header, the footer, the directory, the home page text content and the bookmark in the document to be processed.

Optionally, the device further includes a renaming unit.

The renaming unit is configured to rename the document to be processed associated with the folder corresponding to the matched folder label on the basis of the folder label matched with the document label of the document to be processed.

With the document processing device provided in the embodiments of the present disclosure, a template of a standard format document is acquired, the template including folders having a hierarchical structure. Folder labels corresponding to the folders are generated on the basis of the folders. A document to be processed is acquired. A document label of the document to be processed is generated on the basis of the document to be processed. It is determined whether there is a folder label matched with the document label of the document to be processed. If there is the folder label matched with the document label of the document to be processed, the document to be processed is associated with the folder corresponding to the matched folder label. The folder labels are generated on the basis of the folders and thus are relevant to the folders, and the document label is generated on the basis of the document to be processed and thus is relevant to the document to be processed. Therefore, it can be determined whether the folder matches the document to be processed by determining whether the folder label matches the document label, and the document to be processed is associated with the matched folder, thereby realizing automatic association of the document to be processed and improving efficiency and accuracy of document processing.

In the description of the elements in the various embodiments of the present disclosure, articles "a", "an" and "the" intend to represent one or more elements. Terms "include", "comprise" and "have" are inclusive and mean that there are other elements besides the listed elements.

It should be noted that those skilled in the art can understand and implement all or a part of the procedures described in the method embodiments. The procedures may be implemented by hardware instructed by a computer program. The program may be stored in a computer-readable storage medium. When the program is executed, the procedures described in the various method embodiments may be performed. The storage medium may be a magnetic disk, an optical disc, a read-only memory (ROM) or a random access memory (RAM), or the like.

The embodiments in the specification are described in a progressive manner. Similar parts of the embodiments may be referenced by each other. Each embodiment emphasizes difference from other embodiments. The device embodiments are described simply because they are substantially similar to the method embodiments. For the relevant parts, one may refer to the description in the method embodiments. The above-mentioned device embodiments are merely examples, where the units or modules described as separate components may be or may be not physically separated. Additionally, objective of the solutions in the embodiments may be achieved by a part or all of the units and modules according to practical requirements. Those skilled in the art can understand and implement the solutions without any creative works.

The above are merely specific embodiments of the present disclosure. It should be noted that those skilled in the art can make improvements and modifications without departing from the principle of the present disclosure, and these modifications and improvements shall also fall within the protection scope of the present disclosure.

The invention claimed is:

1. A document processing method, comprising:
    acquiring a template of a standard format document, the template comprising folders having a hierarchical structure, and generating folder labels corresponding to the folders;
    acquiring a document to be processed and generating a document label of the document to be processed; and
    determining whether there is a folder label matched with the document label of the document to be processed, and associating the document to be processed with the folder corresponding to the matched folder label in a case that there is the folder label matched with the document label of the document to be processed.

2. The method according to claim 1, wherein the generating folder labels corresponding to the folders comprises:
    acquiring names of the folders; and
    generating folder labels corresponding to the folders on the basis of the names of the folders.

3. The method according to claim 1, wherein the generating a document label of the document to be processed comprises:
    acquiring a name of the document to be processed; and
    generating a document label of the document to be processed on the basis of the name of the document to be processed.

4. The method according to claim 1, wherein the generating a document label of the document to be processed comprises:
    analyzing the document to be processed to acquire at least one of a text title, a header, a footer, a directory, a home page text content and a bookmark in the document to be processed; and
    generating a document label of the document to be processed on the basis of at least one of the text title, the header, the footer, the directory, the home page text content and the bookmark in the document to be processed.

5. The method according to claim 1, further comprising:
    renaming the document to be processed associated with the folder corresponding to the matched folder label, on the basis of the folder label matched with the document label of the document to be processed.

6. The method according to claim 2, further comprising:
    renaming the document to be processed associated with the folder corresponding to the matched folder label, on the basis of the folder label matched with the document label of the document to be processed.

7. The method according to claim 3, further comprising:
    renaming the document to be processed associated with the folder corresponding to the matched folder label, on the basis of the folder label matched with the document label of the document to be processed.

8. The method according to claim 4, further comprising:
    renaming the document to be processed associated with the folder corresponding to the matched folder label, on the basis of the folder label matched with the document label of the document to be processed.

9. A document processing device, comprising: a memory and a processor; wherein
    program instructions are stored in the memory; and
    the processor executes the program instructions stored in the memory to perform the following operations of:
    acquiring a template of a standard format document, the template comprising folders having a hierarchical structure, and generating folder labels corresponding to the folders;
    acquiring a document to be processed and generating a document label of the document to be processed;
    determining whether there is a folder label matched with the document label of the document to be processed; and
    associating the document to be processed with the folder corresponding to the matched folder label in a case that there is the folder label matched with the document label of the document to be processed.

10. The device according to claim 9, wherein the processor executes the program instructions stored in the memory to perform the following operations of:
    acquiring a template of a standard format document, the template comprising folders having a hierarchical structure;
    acquiring names of the folders; and
    generating folder labels corresponding to the folders on the basis of the names of the folders.

11. The device according to claim 9, wherein the processor executes the program instructions stored in the memory to perform the following operations of:
    acquiring a document to be processed;
    acquiring a name of the document to be processed; and
    generating a document label of the document to be processed on the basis of the name of the document to be processed.

12. The device according to claim 9, wherein the processor executes the program instructions stored in the memory to perform the following operations of:

acquiring a document to be processed;

analyzing the document to be processed to acquire at least one of a text title, a header, a footer, a directory, a home page text content and a bookmark in the document to be processed; and generating a document label of the document to be processed on the basis of at least one of the text title, the header, the footer, the directory, the home page text content and the bookmark in the document to be processed.

13. The device according to claim 9, the processor executes the program instructions stored in the memory to perform the following operations of:

renaming the document to be processed associated with the folder corresponding to the matched folder label, on the basis of the folder label matched with the document label of the document to be processed.

14. The device according to claim 10, the processor executes the program instructions stored in the memory to perform the following operations of:

renaming the document to be processed associated with the folder corresponding to the matched folder label, on the basis of the folder label matched with the document label of the document to be processed.

15. The device according to claim 11, the processor executes the program instructions stored in the memory to perform the following operations of:

renaming the document to be processed associated with the folder corresponding to the matched folder label, on the basis of the folder label matched with the document label of the document to be processed.

16. The device according to claim 12, the processor executes the program instructions stored in them memory to perform the following operations of:

renaming the document to be processed associated with the folder corresponding to the matched folder label, on the basis of the folder label matched with the document label of the document to be processed.

\* \* \* \* \*